United States Patent
Ha et al.

(10) Patent No.: US 7,952,860 B2
(45) Date of Patent: May 31, 2011

(54) MOBILE TERMINAL HAVING EXTENDIBLE KEYPAD

(75) Inventors: Ho Jong Ha, Suwon-si (KR); Soon Ik Cho, Gyeonggi-do (KR); Seung Woo Lim, Seoul (KR); Hee Kwan Kim, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 104 days.

(21) Appl. No.: 12/428,040

(22) Filed: Apr. 22, 2009

(65) Prior Publication Data
US 2009/0279239 A1 Nov. 12, 2009

(30) Foreign Application Priority Data

May 9, 2008 (KR) .................. 10-2008-0043487

(51) Int. Cl.
*H05K 5/00* (2006.01)
*H05K 7/00* (2006.01)
(52) U.S. Cl. ................. 361/679.11; 361/679.2
(58) Field of Classification Search ............. 361/679.11, 361/679.2
See application file for complete search history.

(56) References Cited

U.S. PATENT DOCUMENTS

| 5,659,307 | A * | 8/1997 | Karidis et al. | ................. 341/22 |
| 6,536,966 | B1 * | 3/2003 | Butler | ........................ 400/492 |

* cited by examiner

*Primary Examiner* — Jayprakash N Gandhi
*Assistant Examiner* — Anthony M Haughton
(74) *Attorney, Agent, or Firm* — The Farrell Law Firm, P.C.

(57) ABSTRACT

A mobile terminal is provided in which gaps between keys provided in a second main body change as a first main body moves. The mobile terminal includes a first main body; a second main body having a plurality of keys; and a hinge connecting the first main body and the second main body, wherein when the first main body opens from the second main body, the second main body extends and gaps between the plurality of keys are widened, and when the first main body closes on the second main body, the second main body retracts and the gaps between the plurality of keys are narrowed. Therefore, when the mobile terminal is opened, gaps between keys provided in the mobile terminal are widened and thus a user can more conveniently use the keys provided in the mobile terminal.

7 Claims, 5 Drawing Sheets

FIG. 6
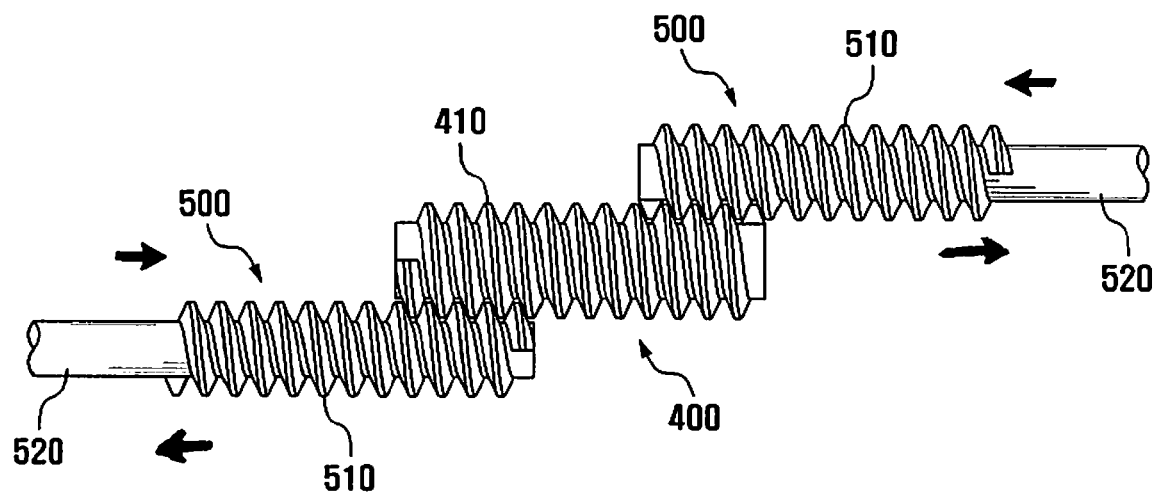
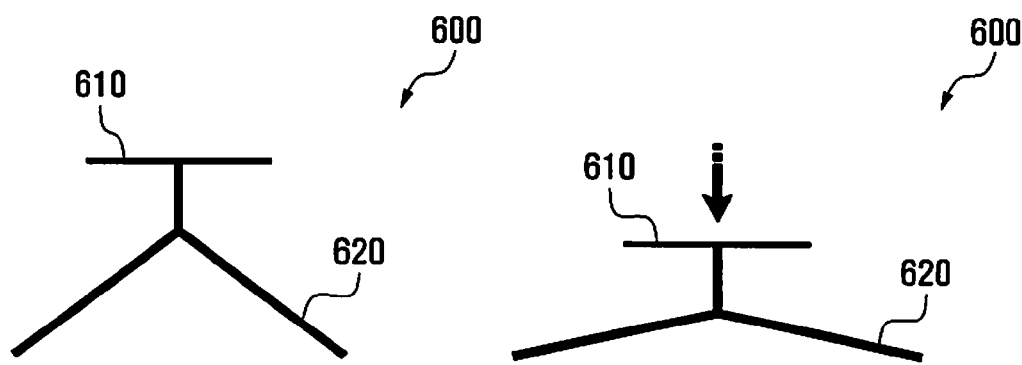
FIG. 7A      FIG. 7B

MOBILE TERMINAL HAVING EXTENDIBLE KEYPAD

PRIORITY

This application claims priority under 35, U.S.C. §119, to an application filed in the Korean Intellectual Property Office on May 9, 2008 and assigned Serial No. 10-2008-0043487,, the contents of which are incorporated herein by reference.

BACKGROUND OF THE INVENTION

1. Field of the Invention

The present invention relates to a mobile terminal, and more particularly, to a mobile terminal in which gaps between keys provided in a second main body change as a first main body moves.

2. Description of the Related Art

In general, a mobile terminal is an electronic device with which a user can freely communicate regardless of time and location. Nowadays, the mobile terminal has been developed to perform functions such as Internet connection and digital broadcasting reception as well as a communication function. Further, functions such as document writing and a game player are added to the mobile terminal. When the user uses such various functions of the mobile terminal, the number of times to input by keys provided in the mobile terminal increases.

The mobile terminal has a small size for convenience of carrying. However, as the size of the mobile terminal reduces, the size of keys provided in the mobile terminal reduces accordingly, and gaps between the keys are also reduced. Accordingly, the user feels much inconvenience in fingering keys provided in the mobile terminal. However, if such inconvenience is solved by increasing the size of the keys, or by widening gaps between the keys, the size of the mobile terminal inevitably increases. Therefore, a mobile terminal in which gaps between the keys decrease when the mobile terminal is not used and increase when the mobile terminal is used is needed.

SUMMARY OF THE INVENTION

The present invention has been made to solve the above problems, and provides a mobile terminal in which gaps between keys decrease when the mobile terminal is closed and increase when the mobile terminal is opened.

The present invention further provides a mobile terminal having a small size by mounting keys in a small space within the mobile terminal.

In accordance with an aspect of the present invention, a mobile terminal includes a first main body; a second main body having a plurality of keys; and a hinge connecting the first main body and the second main body, wherein when the first main body opens from the second main body, the second main body extends and gaps between the plurality of keys increase, and when the first main body closes on the second main body, the second main body retracts and the gaps between the plurality of keys decrease.

Preferably, the second main body includes a fixed case and a pair of moving cases movably coupled to the fixed case, wherein the moving cases move according to movement of the first main body.

Preferably, the moving cases are elastically coupled to the fixed case through a spring.

Preferably, the second main body further includes a plurality of key supports for mounting the keys in an upper part thereof; and a plurality of coupling links for connecting adjacent key supports, wherein adjacent coupling links are connected to each other.

Preferably, the second main body further includes a flexible printed circuit board (FPCB) positioned between the key support and the keys mounted in the key support.

Preferably, the coupling links positioned at both outer end parts of the connected coupling links are connected to the moving cases.

Preferably, the second main body further includes a driver positioned in contact with the hinge for moving the moving cases.

Preferably, the driver includes a first gear, and the hinge includes a second gear for engaging with the first gear.

Preferably, the driver includes a pressure transmission part for receiving a pressure from the hinge; and an elastic part connected to the pressure transmission part in a Y-shape for elastically moving.

BRIEF DESCRIPTION OF THE DRAWINGS

The objects, features and advantages of the present invention will be more apparent from the following detailed description in conjunction with the accompanying drawings, in which:

FIG. 6 is a front view illustrating a driver of a mobile terminal according to another exemplary embodiment of the present invention;

FIG. 7A is a diagram schematically illustrating a driver of a mobile terminal in a closed position according to another exemplary embodiment of the present invention; and FIG. 7B is a diagram schematically illustrating the driver of FIG. 7A when the terminal is in an opened position.

DETAILED DESCRIPTION OF EXEMPLARY EMBODIMENTS

Figure 1A:
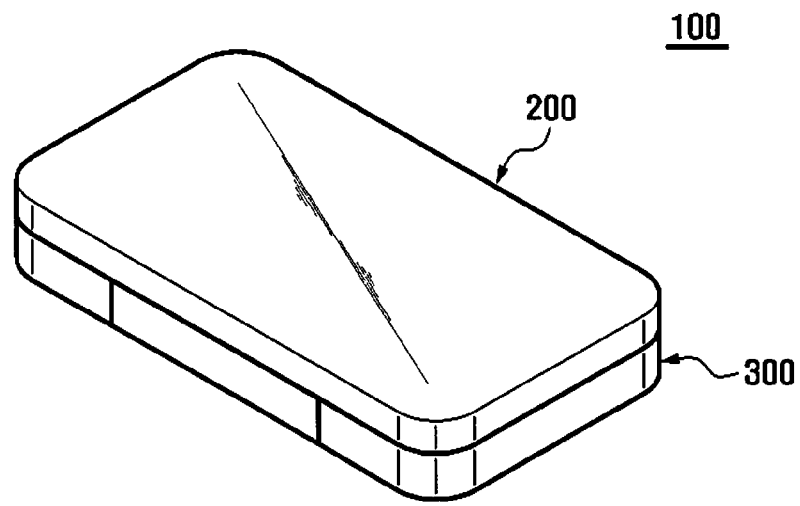
FIG. 1A is a perspective view illustrating a closed state of a mobile terminal according to an exemplary embodiment of the present invention.

Hereinafter, exemplary embodiments of the present invention are described in detail with reference to the accompanying drawings. The same reference numbers are used throughout the drawings to refer to the same or like parts. The views in the drawings are schematic views only, and are not intended to be to scale or correctly proportioned. Detailed descriptions of well-known functions and structures incorporated herein may be omitted for clarity and brevity.

Figure 1B:
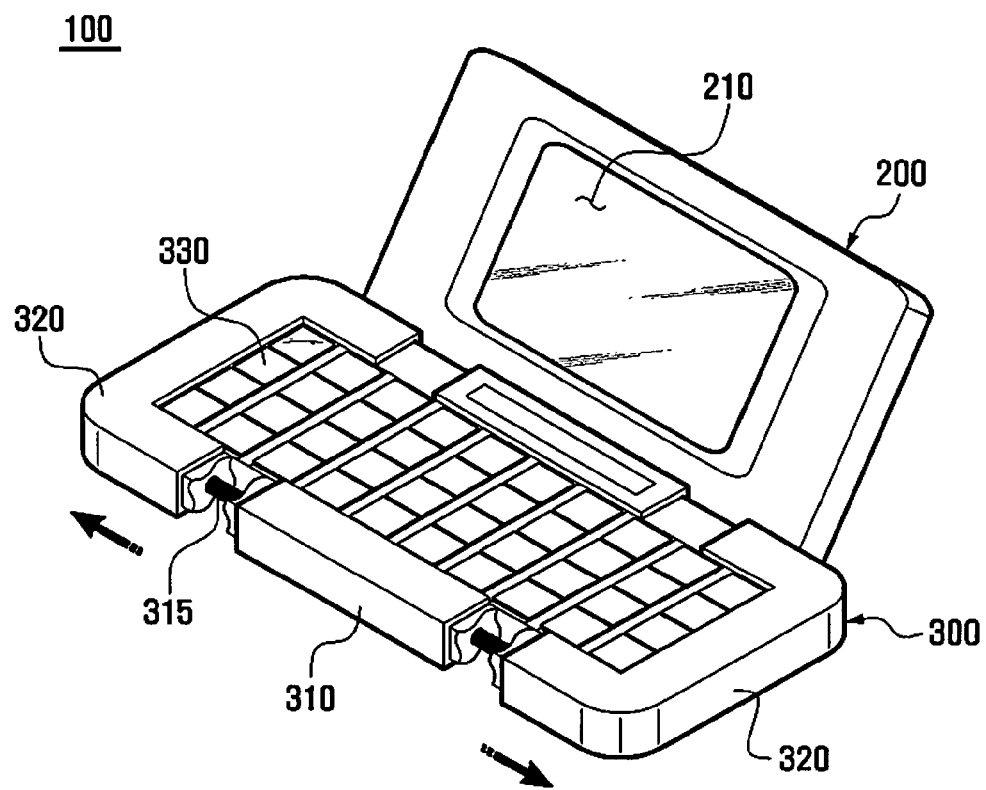
FIG. 1B is a perspective view illustrating an opened state of the mobile terminal of FIG. 1A.

FIGS. 1A and 1B are perspective views illustrating closed and opened states of a mobile terminal 100 according to an exemplary embodiment of the present invention.

Referring to FIG. 1A, a first main body 200 and a second main body 300 close on each other. Therefore, a user can conveniently carry the mobile terminal 100.

When the user opens the mobile terminal 100, both ends of the second main body 300 extend outward along an extension direction. In the present exemplary embodiment, the mobile terminal 100 is a folder type mobile terminal, however the present invention is not limited thereto. When the first main body 200 opens from the second main body 300, a display unit 210 provided at an inner surface of the first main body 200 is exposed.

The second main body 300 extends by movement of the first main body 200, as shown in FIG. 1B. The second main body 300 includes a fixed case 310 and a pair of moving cases 320. The fixed case 310 remains in a fixed position regardless of movement of the first main body 200. The moving cases 320 are elastically coupled to both end parts of the fixed case 310 through a spring 315. The moving action of the moving cases 320 is softened by the spring 315.

The moving cases 320 move outward away from the fixed case 310 at both end parts of the fixed case 310 when the first main body 200 opens. The second main body 300 can thereby extend.

As the second main body 300 extends, key gaps between keys 330 provided in the second main body 300 increase in an extension direction. The increased key gaps enable the user conveniently input the keys 330. Particularly, when the user inputs the keys 330 very quickly, in cases such as writing a character message or playing a game, increased key gaps are especially convenient for key input.

When the first main body 200 closes on the second main body 300, as shown in FIG. 1A, the second main body 300 is retracted, and the key gaps between the keys 330 provided in the second main body 300 decrease.

Figure 2A:
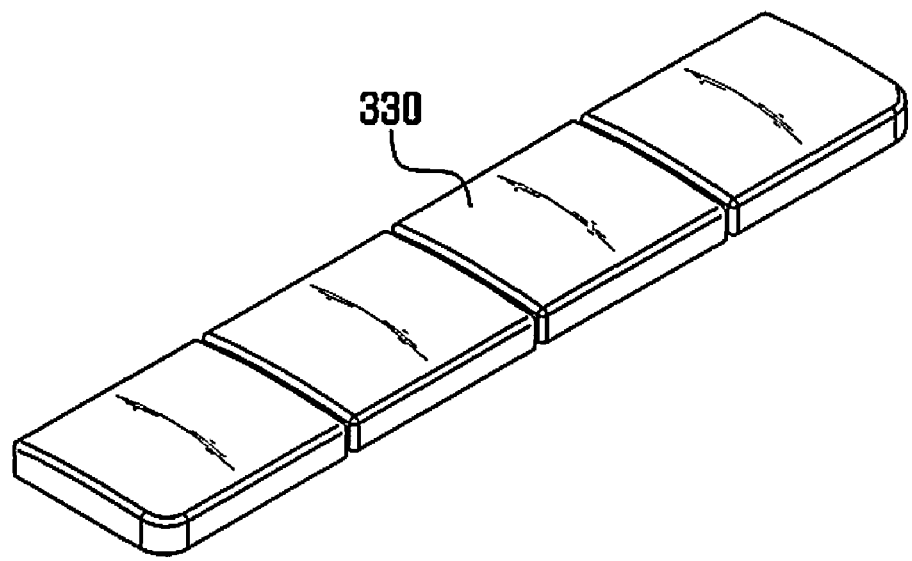
FIG. 2A is a perspective view illustrating keys of the mobile terminal of FIG. 1A.
Figure 2B:
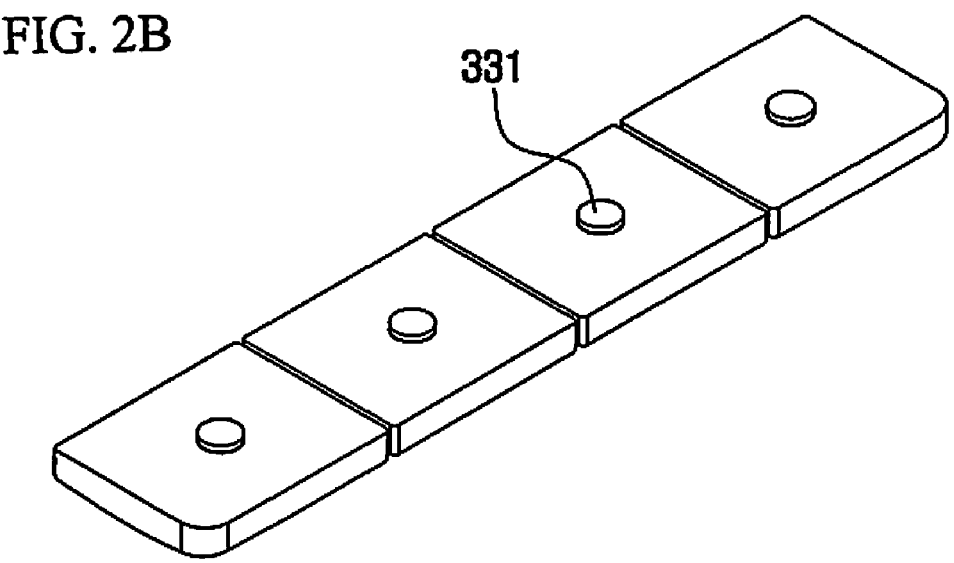
FIG. 2B is a perspective view illustrating from below the keys of FIG. 2A.

FIGS. 2A and 2B are perspective views illustrating, from above and below respectively, the keys 330 of the mobile terminal 100 of FIG. 1B.

Referring to FIG. 2A, the keys 330 can be grouped in a set in which a predetermined quantity of the keys 330 are integrally connected. In the s present exemplary embodiment, as shown in FIG. 2A, four keys are connected in one set. However, in other exemplary embodiments, the quantity of keys may differ in one set. All keys in a set move together when the second main body 300 moves. Numerals or characters to be input may be printed on upper surfaces of the keys 330.

Referring to FIG. 2B, which is a view from below the keys 330, contact points 331 are formed at the underside of the keys 330. The contact point 331 transfers input of the key 330 to a flexible printed circuit board (FPCB). Each key 330 has at least one contact point 331.

Figure 3:
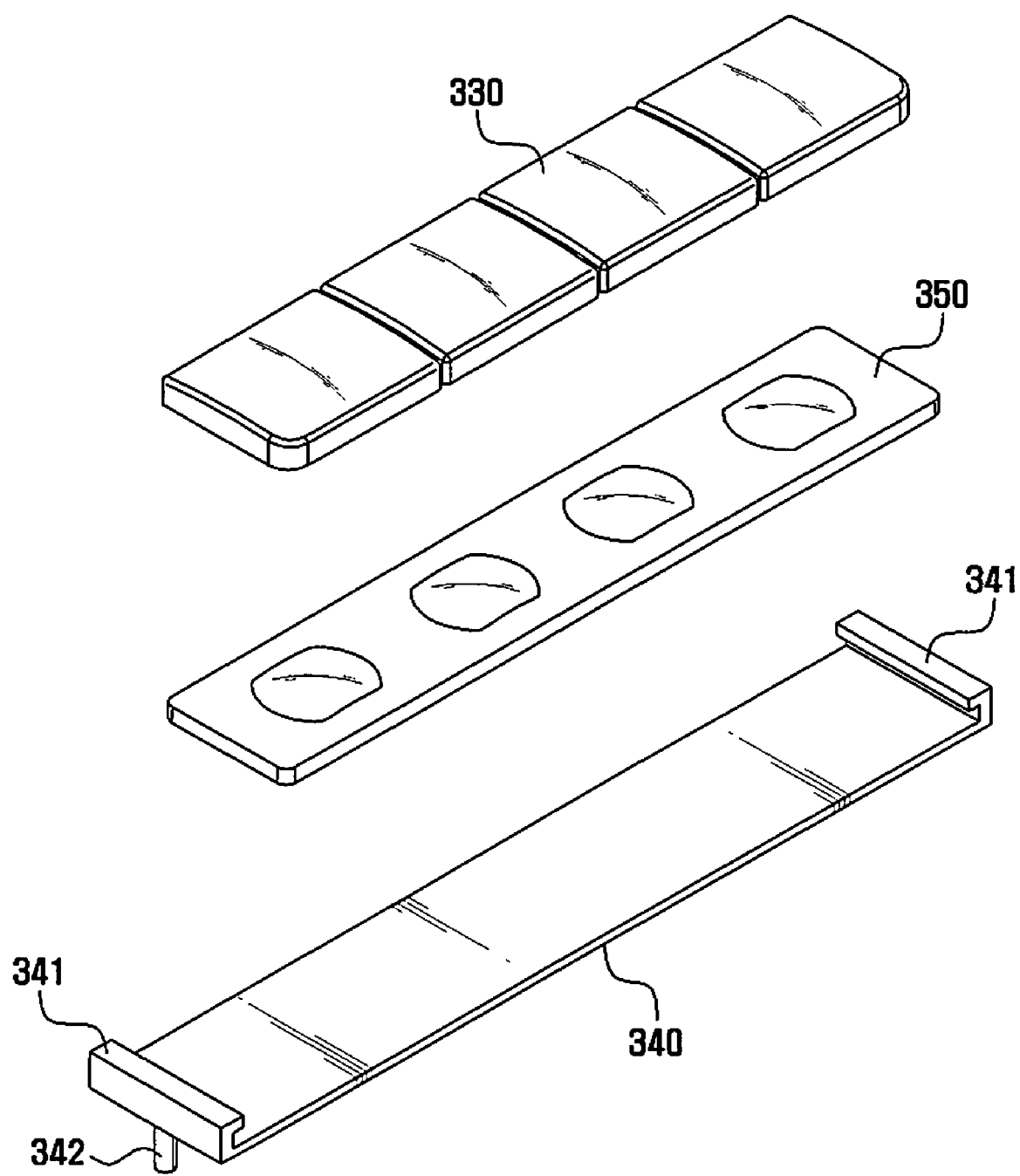
FIG. 3 is an exploded perspective view illustrating a key support and a flexible PCB of the mobile terminal of FIG. 1A.

FIG. 3 is an exploded perspective view illustrating a key support and FPCB of the mobile terminal 100 of FIG. 1A.

Referring to FIG. 3, a key support 340 has a shape of a flat plate for mounting the keys 330 connected in a set. Separation prevention parts 341 for preventing the keys 330 connected in a set from separating from each other in the set are formed at both end parts of the key support 340.

A coupling protrusion 342 is formed at the underside of one end of the key support 340. The separation prevention part 341 of the other end of the key support 340 at which the coupling protrusion 342 is not formed is movably disposed within a groove formed at the fixed case 310 or the moving cases 320.

The keys 330 in each set are mounted in an upper part of the key support 340. An FPCB 350 is mounted between the keys 330 and the key support 340.

Figure 4:
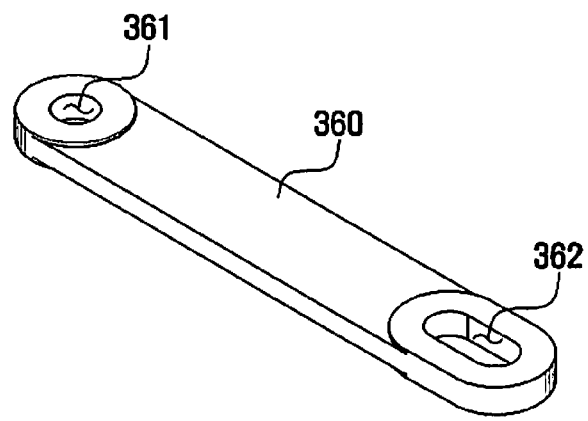
FIG. 4 is a perspective view illustrating a coupling link of the mobile terminal of FIG. 1A.

FIG. 4 is a perspective view illustrating a coupling link of the mobile terminal 100 of FIG. 1A.

Referring to FIG. 4, a coupling link 360 has a bar shape. The coupling link 360 has a first hole 361 at one end part and a second hole 362 at the opposite end part, into each of which is inserted the coupling protrusion 342 of a respective one of two adjacent key supports 340. The first hole 361 and the second hole 362 have different sizes. In the present exemplary embodiment, the second hole 362 is formed longer than the first hole 361. The width of the second hole 362 is slightly greater than that of the coupling protrusion 342 of the key support 340, in order for the coupling protrusion 342 to be movable within the second hole 362. The first hole 361 of one coupling link 360 is movably coupled to the second hole 362 of an adjacent coupling link 360 by one coupling protrusion 342.

Figure 5:
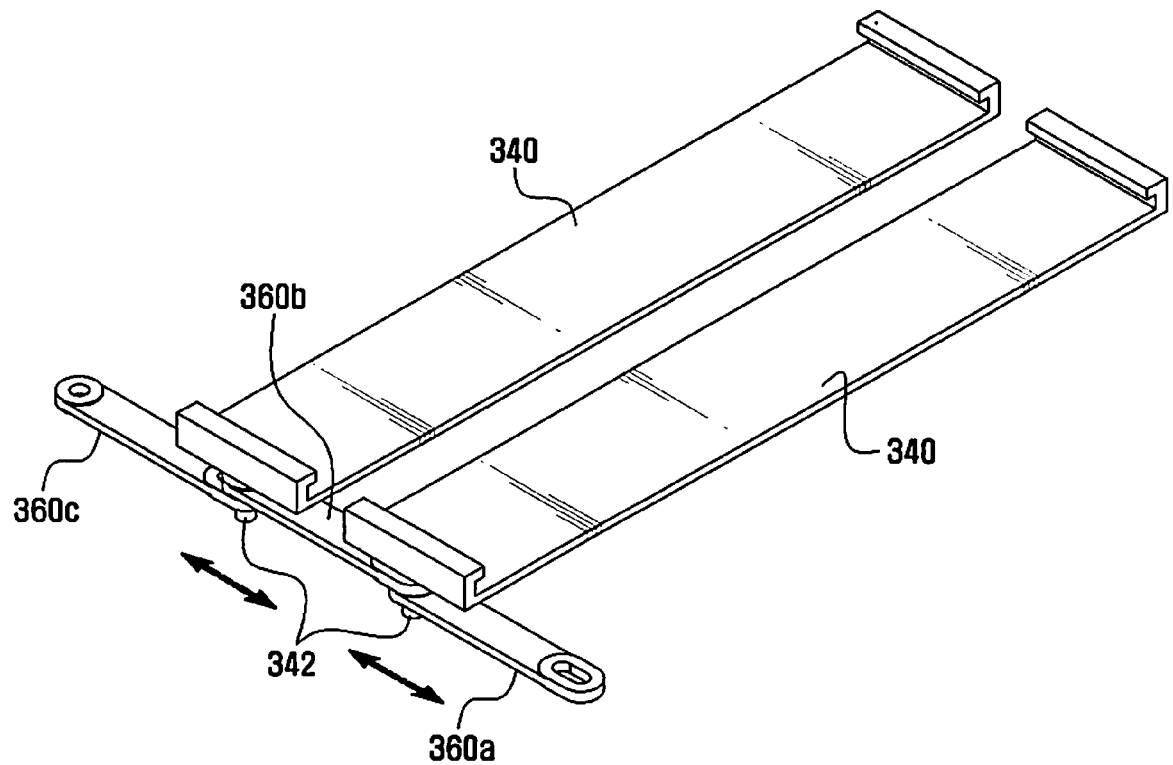
FIG. 5 is a perspective view illustrating a coupled key support and coupling link of the mobile terminal of FIG. 1A.

FIG. 5 is a perspective view illustrating coupled key supports 340 and coupling links 360 of the mobile terminal 100 of FIG. 1A. Referring to FIG. 5, adjacent coupling links 360a, and 360b, and adjacent coupling links 360b, and 360c, are coupled by the coupling protrusion 342 of the corresponding adjacent key supports 340. In this way, the coupling links 360a, 360b, 360c, and further coupling links 360, are continuously connected to form a coupling chain. Two adjacent coupling links are coupled to each other by one coupling protrusion 342 being inserted through the first hole 361 of one coupling link and the second hole 362 of the adjacent coupling link. The end coupling links 360 positioned at both outer ends of the coupling chain are each connected to one of the moving cases 320. When the first main body 200 moves, the moving cases 320 of the second main body 300 move accordingly. When the moving cases 320 move, the end coupling links 360, that are connected to the moving cases 320, move accordingly. When the end coupling links 360 move, each of the inner coupling links 360 of the coupling chain moves accordingly. As each of the coupling links 360 moves, the key supports 340 coupled through the corresponding coupling links 360 and the coupling protrusion 342 move. Thereby, the key gaps between two adjacent sets of the keys 330 mounted in the key supports 340 change.

FIG. 6 is a front view illustrating a driver of the mobile terminal 100 according to another exemplary embodiment of the present invention. Referring to FIG. 6, in the present exemplary embodiment, each in a pair of drivers 500 includes a first gear 510 and a first gear shaft 520. One first gear shaft 520 is connected to each moving case 320 of the mobile terminal 100. A hinge 400 connects the first main body 200 and the second main body 300. The hinge 400 has a second gear 410 that engages with the first gears 510.

When the first main body 200 moves, the hinge 400 connecting the first main body 200 and the second main body 300 rotates. When the hinge 400 rotates, the second gear 410 provided in the hinge 400 rotates. As the second gear 410 rotates, the first gears 510 engaged with the second gear 410 rotate, and the first gear shafts 520 slide axially in opposite directions as shown in FIG. 6. Thereby, the moving cases 320 connected to the first gear shafts 520 move in opposite directions.

FIGS. 7A and 7B are diagrams schematically illustrating a driver of the mobile terminal 100 in closed and opened positions, respectfully, according to another exemplary embodiment of the present invention.

Referring to FIG. 7A, a driver 600 includes a pressure transmission part 610 and an elastic part 620. The pressure transmission part 610 receives a pressure from a hinge (not shown) that connects the first main body 200 and second main body 300. The elastic part 620 has a Y-shaped form and moves elastically. A central portion of the Y-shaped elastic part 620 is connected to the pressure transmission part 610, and the divided ends of the elastic part 620 are each connected to a different one of the moving cases 320. When the mobile terminal 100 is closed, the divided ends of the elastic part 620 are closely disposed, as shown in FIG. 7A. When the first main body 200 is opened, the hinge presses the pressure transmission part 610 of the driver 600. When the pressure transmission part 610 is pressed downwards, the divided ends of the elastic part 620 are separated further apart, as shown in FIG. 7B. Therefore, the moving cases 320 connected to the divided ends of the elastic part 620 move.

In the described exemplary embodiments of the present invention, means for moving the moving cases 320 are described with reference to FIGS. 6, and 7A-7B, however the present invention is not limited thereto and various means of moving the moving cases 320 of the second main body 300 according to movement of the first main body 200 may be used.

The mobile terminal according to the present invention is a mobile electronic appliance, such as a mobile phone, personal digital assistant (PDA), global positioning system (GPS) device, navigation device, digital broadcasting receiver, and portable multimedia player (PMP).

As described above, according to the present invention, when using a mobile terminal, gaps between keys provided in the mobile terminal are widened and thus a user can more conveniently use the keys provided in the mobile terminal.

Further, keys can be mounted in a small space of the mobile terminal and a size of the mobile terminal can thus be reduced.

Although exemplary embodiments of the present invention have been described in detail hereinabove, it should be clearly understood that many variations and modifications of the basic inventive concepts herein described, which may appear to those skilled in the art, will still fall within the spirit and scope of the exemplary embodiments of the present invention as defined in the appended claims.

What is claimed is:

1. A mobile terminal, comprising:
a first main body;
a second main body having a plurality of keys disposed with a key gap changeable between adjacent keys;
a hinge connecting the first main body and the second main body,
wherein when the first main body opens from the second main body, the second main body extends and the key gap increases,
wherein when the first main body closes on the second main body, the second main body retracts and the key gap decreases,
wherein the second main body comprises:
a fixed case;
a pair of moving cases movably coupled to the fixed case, wherein the moving cases move according to a first main movement of the first main body;
a plurality of key supports for mounting the keys in an upper part of the second main body; and
a plurality of coupling links for connecting adjacent key supports,
wherein adjacent coupling links are connected to each other to form a coupling chain.

2. The mobile terminal of claim 1, wherein the moving cases are elastically coupled to the fixed case through a spring.

3. The mobile terminal of claim 1, wherein the second main body further comprises a flexible printed circuit board (FPCB) positioned between each key support and the keys mounted in the each key support.

4. The mobile terminal of claim 1, wherein outer coupling links positioned at both outer end parts of the coupling chain are connected to the moving cases.

5. The mobile terminal of claim 4, wherein the second main body further comprises a driver positioned in contact with the hinge for moving the moving cases.

6. The mobile terminal of claim 5, wherein the driver comprises a first gear, and the hinge comprises a second gear engaging with the first gear.

7. The mobile terminal of claim 5, wherein the driver comprises:
a pressure transmission part for receiving a pressure from the hinge; and
an elastic part connected to the pressure transmission part in a Y-shape for elastically moving the moving cases.

* * * * *